UNITED STATES PATENT OFFICE.

THOMAS T. WRIGHT, OF MEMPHIS, TENNESSEE.

IMPROVEMENT IN MEDICAL COMPOUNDS.

Specification forming part of Letters Patent No. 140,866, dated July 15, 1873; application filed June 13, 1873.

To all whom it may concern:

Be it known that I, THOMAS T. WRIGHT, of Memphis, in the county of Shelby and State of Tennessee, have invented certain new and useful Improvements in Medical Compound called "Cholera Cure;" and I do hereby declare the following to be a full, clear, and exact description of the invention, such as will enable others skilled in the art to which it pertains to make and use it.

My invention has reference to that class of medical compounds used in the cure of cholera, cholera-morbus, and diarrhea, and is formed by compounding apple-brandy, loaf-sugar, black pepper, and gum camphor.

To prepare this medicine, I take one gallon of apple-brandy, and add thereto two pounds of loaf-sugar, one-fourth pound pulverized black pepper, and two ounces of gum camphor. Mix thoroughly until the sugar and camphor are dissolved. Ignite the brandy, and burn down the mixture to a sirup, stirring it all the while the brandy continues to burn.

This medicine, when properly compounded and prepared, is an infallible cure for cholera and kindred diseases.

The apple-brandy used is of best quality—known as fourth-proof.

I claim as my invention—

A medicine composed of the ingredients above enumerated, mixed and compounded in about the proportions and manner herein specified, and for the purpose set forth.

In testimony that I claim the foregoing I have hereunto set my hand this 2d day of June, 1873.

THOMAS T. WRIGHT.

Witnesses:
J. W. VERNON,
R. E. RICHARDSON.